Figure 1:
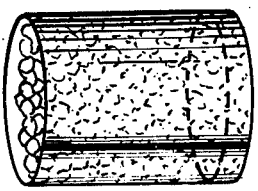
Figure 2:
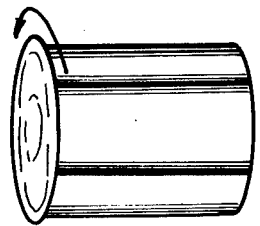
Figure 3:
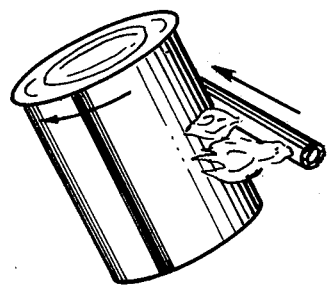
Figure 4:
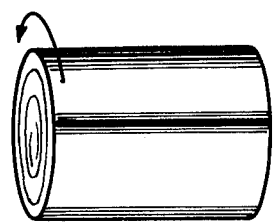
Figure 5:
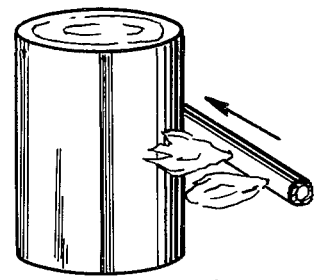
Figure 6:
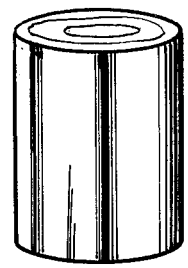
Figure 7:
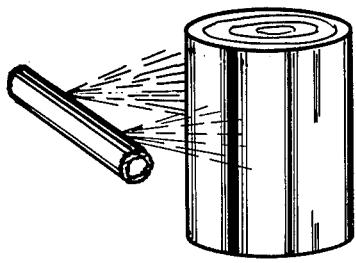

United States Patent [19]

Beauvais et al.

[11] 4,156,741
[45] May 29, 1979

[54] METHOD OF CANNING FOOD PRODUCTS AND CANNED PRODUCT

[75] Inventors: Max Beauvais, Saint-Georges-Motel; Georges Thomas, Ville d'Avray, both of France

[73] Assignee: Etablissements J. J. Carnaud & Forges de Basse-Indre, Boulogne, France; by said Georges Thomas

[21] Appl. No.: 455,381

[22] Filed: Mar. 27, 1974

Related U.S. Application Data

[63] Continuation-in-part of Ser. No. 298,608, Oct. 18, 1972, abandoned.

[30] Foreign Application Priority Data

Oct. 29, 1971 [FR] France ................. 71 39087

[51] Int. Cl.² .............................................. A23L 3/10
[52] U.S. Cl. ................................... 426/131; 426/402; 426/404; 426/406
[58] Field of Search ............... 426/402, 403, 407, 408, 426/506, 509, 521, 523, 520, 524, 405, 406, 131

[56] References Cited

U.S. PATENT DOCUMENTS

| 2,502,196 | 3/1950 | Ball | 99/214 |
|---|---|---|---|
| 2,652,964 | 9/1953 | Bjering | 426/402 |
| 2,785,986 | 3/1957 | Pickens | 99/182 |
| 2,789,058 | 4/1957 | Ball | 99/214 |
| 3,873,747 | 3/1975 | Evert | 426/131 |
| 3,875,318 | 4/1975 | Davies | 426/521 |

FOREIGN PATENT DOCUMENTS 863804  3/1961  United Kingdom .................. 99/215

Primary Examiner—Hiram H. Bernstein
Attorney, Agent, or Firm—Albert C. Johnston

[57] ABSTRACT

Food products, such as vegetables, fruits, etc. are efficiently sterilized and/or cooked and canned under high vacuum by filling them into containers, e.g. conventional tin cans, in the presence of only a small amount of water; then securing lids non-sealingly to the open ends of the cans; then passing the cans over a high temperature heat source for direct flame or radiation heating, with their axes inclined, until the liquid collected in a bottom region of each can has come to a boil and the steam formed has driven the free air from the can; then sealing lids tight to the can bodies; then heating the cans to the desired temperature of sterilization and/or cooking and maintaining this temperature for a predetermined period of time; and finally cooling the cans, e.g. by a water spray, whereupon a vacuum of about 700 mm. (27 to 29 inches) of mercury is formed in each can by condensation of the steam therein.

15 Claims, 7 Drawing Figures

METHOD OF CANNING FOOD PRODUCTS AND CANNED PRODUCT

This is a continuation-in-part of copending application Ser. No. 298,608, filed Oct. 18, 1972, and now about to be abandoned.

The present invention relates to improvements in the canning or preservation of solid food products, for example, vegetables, fruits and meats in piece forms, by sterilizing and/or cooking them in containers which preferably are cylindrical.

British Pat. No. 863,804 describes a method of tinning or canning such food products in which open containers are filled with the products and pre-heated over flame to about 100° C., whereupon the containers at this temperature are closed and then, while being turned about their longitudinal axes, are heated directly in flame or by radiation to the sterilization temperature, for example, between 100° C. and 150° C., which is maintained for a predetermined required time, after which the containers are cooled.

That method is widely known as the STERIFLAM method. It gives excellent results particularly as concerns increasing the hourly output of the canning plant and correspondingly reducing investment costs.

The objective of the present invention is to further improve that known method and to provide an improved method which is particularly advantageous for canning or tinning vegetables or other relatively fragile or frail food products. In the course of research and work effected to this end, the applicants discovered the extraordinary fact that by preheating the filled containers with only a small amount of water present in them until this water has boiled and the steam formed has driven the air from the containers, then sealing lids to the containers and thereafter heating them to the sterilization temperature, there is obtained very advantageously a quick sterilization of the canned products and a very high vacuum in the containers upon the cooling of them after sterilization.

The invention thus provides a method of canning or preserving solid food products such as vegetables, fruits and meats by high temperature treatment of them in the canning containers, which comprises filling open containers with pieces of the product and only a small quantity of aqueous liquid, this quantity preferably occupying between 5 and 20% of the container space not occupied by the food product, or about 1 to 5% of the total volume of each container, then applying lids so as to cover non-sealingly the openings of the containers, e.g. by fixing the lids to the container bodies at a certain number of circumferentially spaced points, and then passing the containers, preferably while rotating them about their longitudinal axes with these axes inclined to the horizontal, in front of a heat source arranged so as to heat directly at least the liquid containing bottom region of each container for a period of time sufficient to boil the aqueous liquid which is collected near the bottom of the container and thus cause the steam formed to drive the air out of the container. Then the containers are completely sealed and the sealed containers are heated by direct flame or radiation heating to the sterilization temperature which is maintained for the required predetermined time; and finally the containers are cooled, preferably by spraying them with cold water.

The following observations apply to the operating conditions of the invention:

(1) Only a very short period of heating is needed in order to boil the small amount of water or aqueous liquid present so as to drive the air from the containers through the spaces between the covers and container bodies. A heating time of about 3 to 7 minutes is sufficient to bring the liquid to boil, and a boiling time of about 1 to 2 minutes suffices for the steam formed to permeate the container so as to blow out completely the air and any other gas present in the heat space and occluded by the food product, thus assuring the presence of a pure steam atmosphere inside the container. As the boiling occurs, the resulting steam first heats the contents of the container by condensation and then drives out the air; so the air has been completely eliminated when steam erupts from the cover spaces.

(2) By carrying out the sterilizing heat treatment subsequent to the sealing of the steam-permeated containers, only about one to two minutes of heating are needed for reaching a sterilizing temperature. A temperature between 125° and 135° C. is highly suitable for the sterilization of food products such as vegetables by the aforesaid method. The selected sterilizing temperature advantageously is held for about 1 to 5 minutes in order to assure commercial sterility of the contents of each container.

(3) The spraying with cold water of the containers thus sterilized causes condensation of the steam present in the containers and thus produces a very high vacuum in the containers. The steam usually is fully condensed in about 10 to 30 seconds, ensuring a vary rapid and even cooling of the container contents. As a result, the food products are cooled quickly to their core, and even bulky or dense pieces of food, such, for example, as chicken thighs, are cooled so quickly from the sterilizing temperature to a low vacuum-gained temperature, for example, of 60° C., that the period of the high temperature treatment of the canned products can be accurately controlled and overheating or overcooking of them is readily prevented.

Due to the substantially total absence of air and other non-condensable gas in the steam, a vacuum of the order of 700 mm of mercury, i.e., of between 27 and 29 inches of mercury, is usually reached in the containers upon complete cooling of them. This is beneficial for the preservation of the food products in the cans without detrimental oxidation reactions. In addition, the high vacuum is beneficial for the later heating up of the preserved food products in the cans, as it enables the small amount of liquid present in them to be brought quickly to boil at a temperature in the range of 100° to 180° F. with the formation of steam which by permeation and condensation reheats the contents of the can evenly and very fast.

(4) Further benefits are attained by virtue of the small amount of aqueous liquid present with the canned food product in the containers. This enables reductions of the weight and shipping costs of cans containing a given quantity of food. In addition, it importantly limits osmotic exchange between the food product and the liquid in the cans during storage, so that there is little or no significant depletion of water soluble minerals and vitamins from the food into the liquid.

The filling of the containers at the outset of the canning process may be effected by first adding the required small amount of water, either as such or in a desired brine, juice or sauce, into upright cans having open tops and then filling each can up to the required head level with elements, or pieces, of the food product.

Of course, as well, the liquid may be added with the food product or after the cans are filled with the food product. Furthermore, in the canning of foods that naturally contain watery juices, such for example, as pieces of beets or pineapple, the food product itself may liberate into the cans enough water to serve the needs of the process. It is necessary only that the filled containers be provided with an amount of free aqueous liquid which, though occupying only a minor proportion of the container space not occupied by the solid food product, is sufficient, upon being boiled after the lids have been non-sealingly applied, to permeate with steam all the free space in each container so that substantially all the air and any other non-condensing gas present will be driven out by the steam. When canning vegetables in cans of 425 cc. volume, for example, about 5 to 20 cc. of water usually is added to each can in the filling stage of the process.

The filled and non-sealingly covered containers are held tilted during the preliminary heating so that the small quantity of liquid present in each container will collect in a definite bottom region thereof situated directly opposite the heating source. The containers are also rotated about their longitudinal axes in order to avoid local overheating of portions of them not covered by the liquid. The degree of tilting best suited for containers of a given size and shape and given contents is easily determined by preliminary tests. The tilting usually is to an angle of between 10° and 30° from the horizontal for containers having the usual dimensions of canning tins. Simple preliminary tests also enable the determination of the amount of hot water or other aqueous liquid and the time of preliminary heating best suited for each product and type of container.

Before the preliminary heating of the filled containers, the covers or lids of the containers are secured non-sealing in place over their open ends so that only a limited space remains for the passage of air or other gas from inside each container. In the use of cylindrical canning tins the lids usually are placed on the can bodies and clinched thereto at several points along their circumference. This clinching may be effected as the first step of a seaming operation by which the lids will be completely sealed to the cans after the liquid boiling, or curing, stage of the process.

The method of the invention is schematically illustrated in the accompanying drawing, in which the several figures represent successive stages of the process as follows:

1. Filling the can with the food product in the presence of a small amount of water or other aqueous liquid, e.g. an amount equal to 1 to 5% of the volume of the can;
2. Clinching the lid to the can;
3. Subjecting the liquid containing bottom region of the can, while the can is tilted and being rotated about its axis, to preliminary heating over a high temperature heat source, for boiling the liquid in the can bottom until the steam produced has driven all the air out of the can through the space(s) remaining between the lid and the can body;
4. Completely sealing (seaming) the lid to the can body;
5. Heating the can and contents to the selected sterilizing temperature, e.g. to 125°–135° C. in 1 to 2 minutes;
6. Holding the sterilizing heat, e.g. for 1 to 5 minutes, to assure commercial sterility; and
7. Cooling the can, preferably by a cold water spray, with the formation of a high vacuum of about 700 mm. Hg by condensation of the steam in the can.

For carrying out the preliminary heating in industrial canning operations, for example, a table may be provided with at least one series of pairs of slides constituted by parallel longitudinal bars mounted for adjustment of the space between the bars of each pair. The first of lower bar comprises means such as angle irons for supporting the containers at an angle to the horizontal, and the other or upper bar is positioned in a plane disposed above the first bar so that the axes of the clinched containers resting on the two bars are inclined at the appropriate angle. Two lateral endless chains mounted one above another at each side of the table and driven by any suitable known means at the required speed are joined by horizontal rods which are spaced apart to enable a container to be received between two consecutive rods so that the container will be rotated about its own axis as it undergoes longitudinal displacement. Each rod carries a friction roller adapted to ensure the rotation of the container engaged by it when the chains are in movement. Finally, heating sources such as gas burners are disposed under the first bar so as to heat directly at least a portion of the side walls and of the bottoms of the containers which pass above them.

The containers which leave the preliminary heating or curing table are then completely sealed either by seaming in two steps or by finishing the seaming previously started for loosely securing the covers. Then the sealed containers are sterilized, for which purpose they may be, for example, introduced one after another into a sterilizer advantageously of the type described in British Pat. No. 863,804, where the heating for sterilization and/or cooking is carried out with the length of stay of the containers in the sterilizer previously determined experimentally for each type of container and each product. The containers are then passed through a simple cold water spray and finally are allowed to cool a few minutes longer before being removed for packaging or storage.

An apparatus in which the containers follow a helical path may be employed in order to effect the preliminary heating and then the final heating, one after the other. Along the helical path the containers are in successive order pre-heated, sealed tight by seaming or other suitable means, sterilized and finally cooled. An apparatus considered satisfactory for such a treatment is disclosed in U.S. Pat. No. 3,032,171. That apparatus provides helical paths for the containers by which their longitudinal axes are inclined at an angle suitable for the preliminary heating stage of the present invention. A useful apparatus may therefore comprise at least one helical conveyor comprising a travelling grill having parallel bars displaceable along a closed curve and thereby sweeping along a cylindrical surface inside of which is at least one stationary helical channel, whereby each successive pair of bars in combination with the sides of the channel describes a moving compartment adapted to receive a container to be conveyed. A number of identical conveyors may be arranged side by side to enable the introduction, treatment and handling of a plurality of containers simultaneously.

It has been found that the combination of the preliminary treatment according to the invention with the cooking or sterilization according to the aforesaid British patent enables the construction of very compact and economical plants in which the total duration of the pre-heating, cooking or sterilization and cooling operations is generally between about 5 and 15 minutes. This enables the canning to be carried out completely in less than 20 minutes, including the time for clinching and final seaming. In other words, the invention provides a process which is particularly inexpensive and furthermore is wholly adaptable to high speed canning lines.

Furthermore, the cans treated according to the invention before sterilizing may be seamed in conventional seamers, i.e. with avoidance of the present need for vacuum seaming machines.

The containers may be of metal or other substances, as well as glass jars.

What is claimed is:

1. A method of sterilizing and/or cooking and canning solid food products, which consists essentially of
   (1) filling open canning containers each with pieces of the food product in the presence of a small quantity of aqueous liquid, said quantity occupying only a minor proportion of the container space not occupied by the food product yet being sufficient to collect in a bottom region of the containers and, upon being boiled with the formation of steam, to drive the air from the container;
   (2) applying a cover non-sealingly to the opening of each container;
   (3) then subjecting the liquid containing bottom region of the container to a preliminary heating at high temperature and thus boiling the liquid in the container until the liquid therein has boiled long enough to drive the air out of the container;
   (4) then by completely sealing the cover to the container sealing the contents in an atmosphere of steam;
   (5) then further heating the container to and holding it at an increased temperature sufficient, and for a time sufficient, at least to sterilize the contents:
   (6) and then cooling the container and thereby producing a high vacuum therein by condensation of the steam therein.

2. A method according to claim 1, said containers being cylindrical, said preliminary heating being effected by passing the containers over and in contact with flame while turning them about their longitudinal axes and holding them tilted so that the liquid in each container substantially covers the region of its bottom and side wall contacted by the flame.

3. A method according to claim 1, said quantity of aqueous liquid occupying between 5 and 20% of said container space.

4. A method according to claim 1, said quantity of aqueous liquid occupying about 1 to 5% of the volume of the container.

5. A method according to claim 1, said cooling being effected by spraying cold water onto the container.

6. A method according to claim 1, each said container being a cylindrical can and being held with its longitudinal axis tilted at an angle of between 10° and 30° to the horizontal during said preliminary heating.

7. A method according to claim 1, said preliminary heating being effected by directly contacting said bottom region with flame.

8. A method according to claim 1, said preliminary heating being effected by exposing said bottom region to a radiation heat source.

9. A method according to claim 1, each said container being a cylindrical can originally open at its top, said cover being applied by clinching the lid of the can to the body thereof at spaced points about the circumference thereof, and said sealing being effected after said preliminary heating by seaming the entire circumference of the lid to the can body.

10. A method according to claim 1, said preliminary heating being effected in a period of 3 to 7 minutes, said further heating being effected to a temperature of about 125° to 135° C. in a period of about 1 to 2 minutes, which temperature is held for a predetermined sterilizing and/or cooking period of about 1 to 5 minutes, and said cooling then being effected quickly by applying a cold water spray to the container.

11. A method of sterilizing and/or cooking and canning solid food products such as vegetables, which consists essentially of filling cylindrical cans open at their tops with pieces of the food product in the presence of a small quantity of aqueous liquid occupying about 5 to 20% of the volume of each can not occupied by the food product; clinching lids non-sealingly to the tops of the cans; then, while rotating each can about its longitudinal axis and holding it inclined so that the liquid therein collects in a certain region of its bottom and side wall, directly heating the liquid containing region of the can by flame and thus boiling the liquid in the can until the liquid therein has boiled long enough for the steam formed to drive substantially all the air out of the can; then seaming the lid to each can so as to seal its contents therein in an atmosphere of steam; then directly heating each can by flame for about 1 to 2 minutes until its contents reach a temperature of about 125° to 135° C. and holding this temperature for a predetermined sterilizing and/or cooking period of about 1 to 5 minutes; and then quickly cooling each can by applying a cold water spray thereto, whereby a high vacuum amounting to at least 27 inches of mercury is produced in the can by condensation of the steam therein.

12. A canned solid food product consisting essentially of a sealed canning container filled with pieces of said food product in heat sterilized state and a small quantity of aqueous liquid in the space within said container not occupied by said food product, said food product being under a high vacuum when said container is at room temperature, said quantity of liquid occupying between 5 and 20% of said space and at least part of said liquid being the condensate of steam that previously completely filled said space by having been boiled thereinto and then sealed therein under atmosphere pressure, said condensate thus constituting means forming and normally maintaining said vacuum in said space.

13. A canned solid food product as defined in claim 12, said quantity of liquid occupying about 1 to 5% of the volume of said container.

14. A canned solid food product as defined in claim 12, said high vacuum amounting to at least about 27 inches of mercury.

15. A canned solid food product as defined in claim 12, said vacuum being sufficiently high that said liquid will boil at a temperature in the range of 100°–180° F.

* * * * *